United States Patent
Schweitzer

(10) Patent No.: US 7,092,398 B2
(45) Date of Patent: Aug. 15, 2006

(54) SYSTEM, METHOD AND COMPUTER PROGRAM PRODUCT FOR CHARGING FOR COMPETITIVE IP-OVER-WIRELESS SERVICE

(75) Inventor: Limor Schweitzer, Santa Clara, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 763 days.

(21) Appl. No.: 09/879,681

(22) Filed: Jun. 11, 2001

(65) Prior Publication Data

US 2001/0055291 A1    Dec. 27, 2001

Related U.S. Application Data

(60) Provisional application No. 60/210,966, filed on Jun. 12, 2000.

(51) Int. Cl.
```
H04L 12/28      (2006.01)
H04M 15/00      (2006.01)
H04M 11/00      (2006.01)
H04J 3/24       (2006.01)
```

(52) U.S. Cl. ............... 370/401; 370/349; 379/114.01; 455/406

(58) Field of Classification Search ............ 370/230, 370/235, 252, 253, 328, 329, 338, 349; 379/114.01–114.09, 88.17; 455/405, 406, 455/410, 445, 450, 452.1, 452.2
See application file for complete search history.

(56) References Cited

U.S. PATENT DOCUMENTS

| | | | |
|---|---|---|---|
| 5,233,642 A | 8/1993 | Renton | |
| 5,319,712 A | 6/1994 | Finkelstein et al. | 380/44 |
| 5,673,322 A | 9/1997 | Pepe et al. | 380/49 |
| 5,727,163 A | 3/1998 | Bezos | 705/27 |
| 5,745,884 A | 4/1998 | Carnegie et al. | 705/34 |
| 5,794,221 A | 8/1998 | Egendorf | 705/40 |
| 5,825,881 A | 10/1998 | Colvin | 705/78 |
| 5,987,137 A | 11/1999 | Karppanen et al. | |
| 6,047,051 A | 4/2000 | Ginzboorg et al. | 379/130 |
| 6,141,404 A * | 10/2000 | Westerlage et al. | 379/118 |
| 6,359,976 B1 * | 3/2002 | Kalyanpur et al. | 379/134 |
| 6,396,828 B1 * | 5/2002 | Liu | 370/352 |
| 6,405,251 B1 * | 6/2002 | Bullard et al. | 709/224 |
| 6,480,485 B1 * | 11/2002 | Kari et al. | 370/352 |
| 6,608,832 B1 * | 8/2003 | Forslow | 370/353 |

(Continued)

FOREIGN PATENT DOCUMENTS

EP        0848361        6/1998

(Continued)

OTHER PUBLICATIONS

Stewart, John, "Connecting with Confidence", Web Techniques. San Francisco: Apr. 2000. vol. 5, Iss. 4; p. 84, 4 pgs.

(Continued)

Primary Examiner—Steven Nguyen
Assistant Examiner—Clemence Han
(74) Attorney, Agent, or Firm—Zilka-Kotab, PC

(57) ABSTRACT

A system, method and computer program product are provided for charging for Internet Protocol (IP) usage utilizing a wireless network. Initially, call description record information is received from a wireless network in real-time. Such call description record information is associated with customer communication over the wireless network. Further collected in real-time is IP content usage information associated with the transmission of content using an IP during the customer communication in real-time. The customer is then charged for the customer communication utilizing the call description record information and the IP content usage information.

31 Claims, 9 Drawing Sheets

U.S. PATENT DOCUMENTS

| | | | |
|---|---|---|---|
| 6,668,046 B1 * | 12/2003 | Albal | 379/119 |
| 6,747,989 B1 * | 6/2004 | Sevanto | 370/466 |
| 6,760,416 B1 * | 7/2004 | Banks et al. | 379/114.01 |
| 6,760,417 B1 * | 7/2004 | Wallenius | 379/114.28 |
| 2001/0051931 A1 | 12/2001 | Schweitzer | 705/65 |
| 2001/0055291 A1 | 12/2001 | Schweitzer | 370/337 |
| 2002/0032800 A1 * | 3/2002 | Puuskari et al. | 709/246 |

FOREIGN PATENT DOCUMENTS

| | | |
|---|---|---|
| EP | 0866596 | 9/1998 |
| WO | 99/27556 | 3/1999 |
| WO | 99/30293 | 6/1999 |
| WO | 99/49404 | 9/1999 |
| WO | 99/56445 | 11/1999 |
| WO | 99/62036 | 12/1999 |

OTHER PUBLICATIONS

Copy of Office Action from 09/879,683 mailed Jan. 13, 2006.

* cited by examiner

SYSTEM, METHOD AND COMPUTER PROGRAM PRODUCT FOR CHARGING FOR COMPETITIVE IP-OVER-WIRELESS SERVICE

RELATED APPLICATION(S)

The present application claims the priority of a provisional application filed Jun. 12, 2000 under Ser. No. 60/210,966, and which is incorporated herein by reference in its entirety. The present application is further related to a co-pending application filed concurrently herewith under the title "SYSTEM, METHOD AND COMPUTER PROGRAM PRODUCT FOR PREPAID WIRELESS VOICE COMMUNICATION AND IP SERVICES" and Ser. No. 09/879,682 and naming Limor Schweitzer as inventor, and a co-pending application filed concurrently herewith under the title "SYSTEM, METHOD AND COMPUTER PROGRAM PRODUCT FOR ALLOWING A CARRIER TO ACT AS A CREDIT-APPROVAL ENTITY FOR E-COMMERCE TRANSACTIONS" and Ser. No. 09/879,683 and naming Limor Schweitzer as inventor.

FIELD OF THE INVENTION

The present invention relates to network accounting, and more particularly to collecting and processing network accounting information.

BACKGROUND OF THE INVENTION

Mobile communication systems have been developed because there has been a need to allow people to move away from fixed telephone terminals without losing their ability to be reached. While the use of different data transmission services in offices has increased, different data services have also been introduced into mobile communication systems. Portable computers enable efficient data processing wherever a user moves. Mobile communication networks provide a user with efficient access network to actual data networks for mobile data transmission.

Digital mobile communication systems, such as the pan-European mobile communication system GSM (Global System for Mobile Communication), support particularly well mobile data transmission. For the GSM, a particular packet mode data transfer service GPRS (General Packet Radio Service) has been developed.

Prior art FIG. 1a shows a block diagram of principal components in the operation of the GPRS system. A packet switching controller SGSN (Serving GPRS Support Node) controls the operation of packet switching service on the cellular network side. The packet switching controller SGSN controls the sign-on and sign-off of the mobile station MS, the updating of the location of the mobile station MS and the routing of data packets to their correct destinations. The mobile station MS is connected to the base station subsystem BSS through a radio interface Um. The base station subsystem is connected to the packet switching controller SGSN through the BSS-SGSN interface Gb.

In the base station subsystem BSS, the base station BTS and the base station controller BSC have been connected to each other by a BTS-BSC interface Abis. The location of the packet switching controller SGSN in the mobile station network can vary, for example, according to which technical implementation is being used. Although in FIG. 1a, the packet switching controller SGSN has been marked outside the base station subsystem BSS, the packet switching controller SGSN can be placed, for example, as a part of the base station BTS connected to the base station subsystem BSS or as a part of the base station controller BSC.

Prior Art FIG. 1b illustrates the various layers of operation of both the mobile station MS and the packet switching controller SGSN. Each layer provides a different function. The International Standardization Organization, ISO, has formulated an OSI model (Open Systems Interconnection) for grouping data transfer into different functional layers. In this model, there are seven layers which are not necessarily needed in all data communication systems.

Transferable information, such as control signaling and data transmitted by the user, between a mobile station MS and a packet switching controller SGSN is exchanged preferably in a data frame mode. The data frame of each layer consists of a header field and a data field. FIG. 1b shows also the structure of data frames being used in the GPRS system in different layers.

The information contained in the data field can be, for example, data entered by the user of the mobile station or signaling data. The data field may contain confidential information which has to be secured as reliably as possible before transmitting it to the radio path. In such a case, the encryption has to be executed in such a way that in all simultaneous connections between the packet switching controller SGSN and mobile stations MS connected to it, a separate encryption key is used. Conversely, it is not preferable to cipher the address data of the data frame by the same encryption key used in the ciphering of the data field, since mobile stations MS use a shared radio path resource, i.e. information in many different connections is transferred in the same channel, for example, at different time intervals. In this case, each mobile station should receive all messages transmitted in the channel concerned and decrypt at least the encryption of the address data to identify to which mobile station the message is intended. Also the packet switching controller SGSN does not know which encryption key should be used.

In the following, the operational functions of the layers of the GPRS system have been presented. The lowest layer is called an MAC layer (Media Access Control) which controls the use of the radio path in the communication between the mobile station MS and the base station subsystem BSS, such as allocating channels for transmitting and receiving packets.

Data transmission between the base station subsystem and the packet controller SGSN in the lowest level is executed at the L2 layer (link layer) in which link layer protocol is used, such as LAPD protocol according to standard Q.921, frame relay protocol or the equivalent. The L2 layer may additionally contain also quality or routing data according to GPRS specifications. Layer L2 has properties of the physical layer and the link layer of the OSI model. The physical transmission line between the base station subsystem BSS and the packet controller SGSN depends, for example, on where the packet controller SGSN has been located in the system.

Above the MAC layer, there is an RLC layer (Radio Link Control) and its function is to divide the data frames formed by the LLC layer into fixed sized packets to be transmitted to the radio path and their transmission and retransmission when necessary. The length of the packets in the GRPS system is the length of one GSM time slot (approximately 0.577 ms).

LLC layer (Logical Link Control) provides a reliable transmission link between the mobile station MS and the packet controller SGSN. The LLC layer, for example, adds to the transmitted message error checking data by means of which it is intended to correct those incorrectly received messages and when necessary, the message can be retransmitted.

SNDC layer (Sub-Network Dependent Convergence) comprises functions like protocol conversions of transmitted information, compression, segmentation and segmentation of messages coming from the upper layer. Additionally, ciphering and deciphering are accomplished at the SNDC layer. The structure of the SNDC frame has been presented also in FIG. 1b. The SNDC frame comprises an SNDC header field (SNDC header) and an SNDC data field (SNDC data). The SNDC header field consists of protocol data (Network Layer Service access point Identity, NLSI) and of SNDC control data, such as determinations of compression, segmentation and ciphering. The SNDC layer functions as a protocol adapter between protocols used at the upper level and the protocol of the LLC layer (link layer).

The transmitted information comes preferably as data packets to the SNDC layer from some application, such as messages according to the GPRS system or packets of the Internet protocol (IP). The application can be, for example, a data application of a mobile station, a telecopy application, a computer program which has a data transmission link to a mobile station, etc.

The MAC layer, RLC layer, LLC layer and the L2 layer contain properties which are described at layer 2 in the OSI model. The above-mentioned layers and the layers described in the OSI model are not, however, distinctly coherent.

The SNDC frame is transferred to the LLC layer where an LLC header field is added to the frame. The LLC header field consists of a Temporary Logical Link Identity (TLLI) and an LLC control part. The packet controller GPRS establishes a TLLI identity for each data transmission link between a mobile station MS and a packet controller GPRS. This data is used in data transmission for defining which data transmission link each message belongs to. Simultaneously, the same TLLI identity can only be used in one data transmission link. After the termination of the link, the TLLI identity used in the link can be allocated to a new link to be subsequently formed. The LLC control part defines the frame number and the command type (info, acknowledge, retransmission request etc.) for ensuring an error free data transfer.

With the various components of a conventional GPRS system of FIGS. 1a–1b now described, a more comprehensive system will now be disclosed. In particular, FIG. 1c illustrates a GPRS system including the various components discussed in FIGS. 1a–b hereinabove, i.e. SGSN, BSS, etc., in addition to other conventional components. For example, the GPRS system of FIG. 1c includes a packet switching controller GGSN (Gateway GPRS Support Node), Home Location Registers (HLRs), Mobile Switching Centers (MSC), Gateway Mobile Services Switching Center (GMSC), Equipment Identity Register (EIR), Mobile Telephone Network (PLMN), Pilot Directory Number (PDN), Switching Center/Visitor Location Register (MSC/VLR), etc.

In addition to the above components of FIG. 1c, a billing system 100 is included for charging customers for use of the GPRS system. Traditionally, such billing system 100 interfaces with a CGF (Charging Gateway Framework) which, in turn, interfaces with the SGSN and the GGSN via a conventional interface, Ga.

The prior art billing system 100 collects information from the GPRS equipment. Such information often takes the form of call description records (CDRs). CDRs traditionally provide a record of called numbers, and a date, time, length and so on of each telephone call. In use, the approach takes the GPRS CDRs, collects them into the CDF, does some processing (such as mapping call-start with call-end) and sends the CDRs to the billing system 100.

Unfortunately, such CDRs received from the GPRS equipment are insufficient in terms of allowing monitoring of the content of the traffic. Accordingly, the CGF does not allow for network accounting based on content. Content-based network accounting involves the collection of various types of information during users' communications over a network. Examples of such network accounting information may include, but is not limited to a session's source, destination, user name, duration, time, date, type of server, volume of data transferred, etc. Armed with such accounting information, various services may be provided that require network usage metering of some sort.

There is therefore a need for a technique of performing network accounting and charging for content usage in a wireless network environment.

DISCLOSURE OF THE INVENTION

A system, method and computer program product are provided for charging for Internet Protocol (IP) usage utilizing a wireless network. Initially, call description record information is received from a wireless network in real-time. Such call description record information is associated with customer communication over the wireless network. Further collected in real-time is IP content usage information associated with the transmission of content using an IP during the customer communication. The customer is then charged for the customer communication utilizing the call description record information and the IP content usage information.

In one embodiment of the present invention, the call description record information may be received from a general packet radio service (GPRS) system. Optionally, fraud and quality of service may be monitored utilizing the call description record information and the IP content usage information.

In another embodiment of the present invention, the customer may be charged for the customer communication based on time data of the call description record information. Further, the customer may be charged for the customer communication based on volume data of the call description record information. As an option, the customer may be charged for the communication by mapping the IP content usage information to the call description record information.

In another aspect of the present invention, a system, method and computer program product may be provided for altering service over a wireless network based on an IP address. In particular, a call may be received from a mobile communication unit utilizing a wireless network. Such mobile communication unit has an IP address associated therewith. Thereafter, the IP address associated with the mobile communication unit is identified. By this design, a service over the wireless network may be altered based on the IP address.

In one embodiment of the present aspect of the invention, the service may be altered by altering a quality of service of the call, altering an access provided to the mobile communication unit during the call, and/or altering a prioritization of the call.

BRIEF DESCRIPTION OF THE DRAWINGS

Prior art

Prior Art

Prior Art

DESCRIPTION OF THE PREFERRED EMBODIMENTS

Figure 1A:
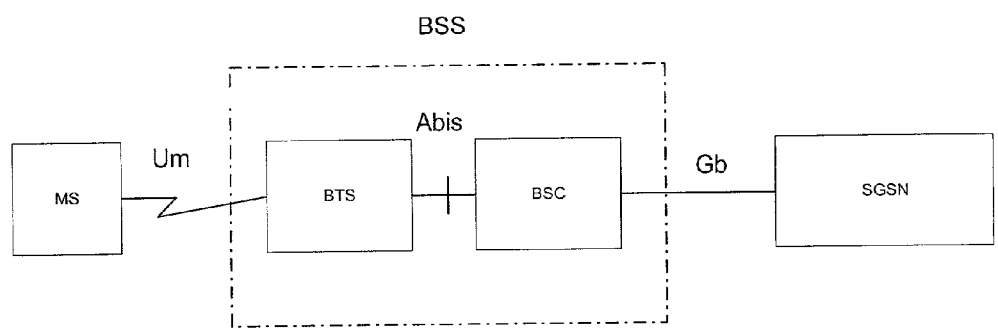
FIG. 1a shows a block diagram of principal components in the operation of a General Packet Radio Service (GPRS) system.
Figure 1B:
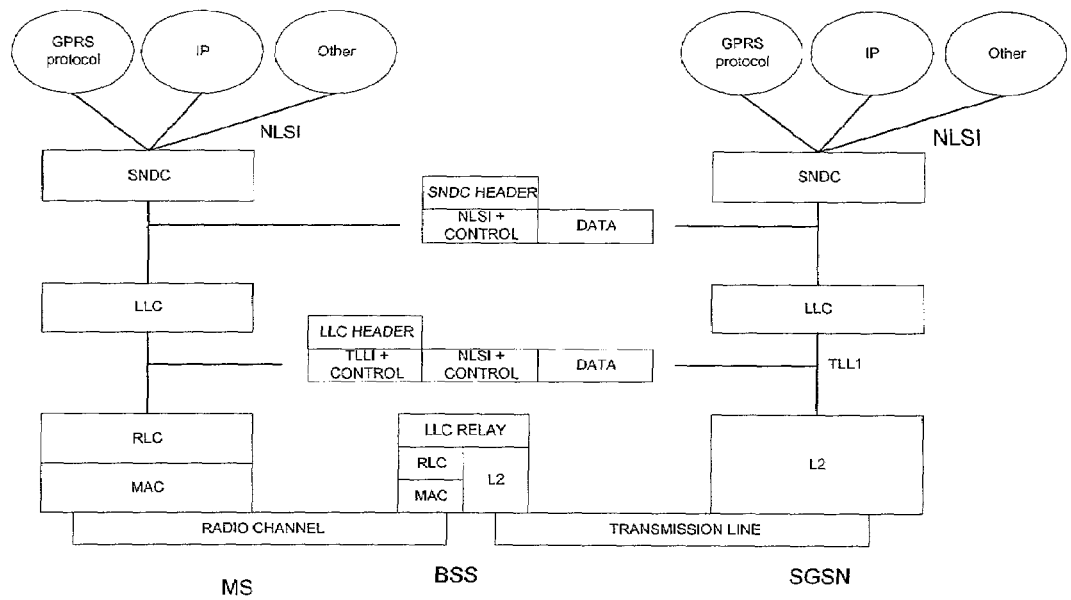
FIG. 1b illustrates the various layers of operation of both the mobile station (MS) and the packet switching controller (SGSN) of the GPRS system.
Figure 1C:
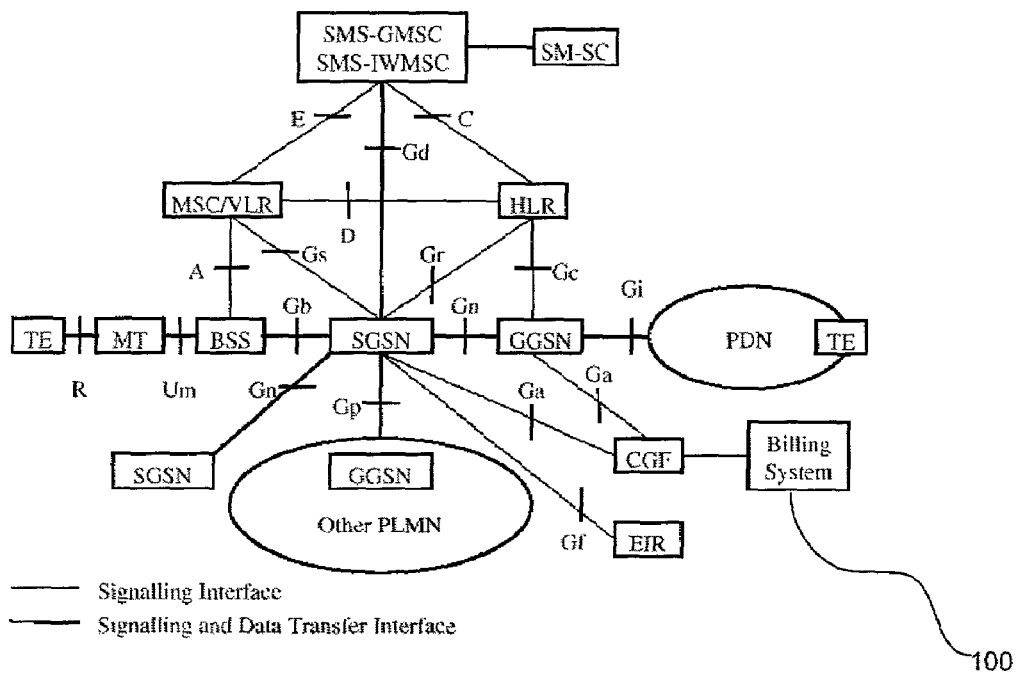
FIG. 1c illustrates a GPRS system including the various components discussed in FIGS. 1a–b hereinabove in addition to other conventional components.
Figure 2:
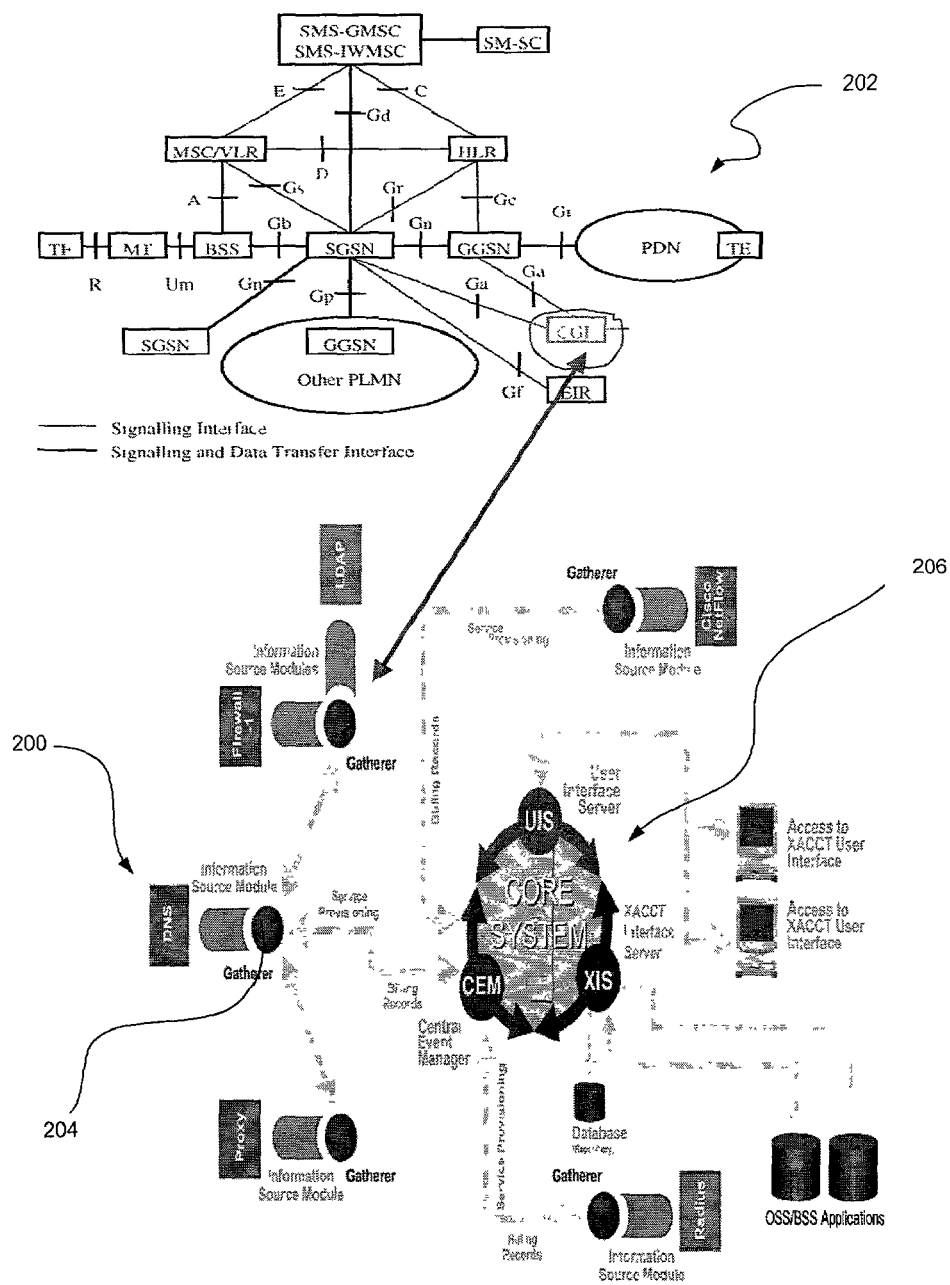
FIG. 2 shows an accounting system in accordance with one embodiment of the present invention and the manner in which it interfaces with the GPRS system.

FIGS. 1a–1c illustrate the prior art. FIG. 2 shows an accounting system 200 in accordance with one embodiment of the present invention and the manner in which it interfaces with a General Packet Radio Service (GPRS) system 202. The system 200 includes a plurality of data gatherers 204 which are in turn a component of a plurality of information source modules (ISMs). Such ISMs interface with the Serving GPRS Support Node (SGSN) and Gateway GPRS Support Node (GGSN) of the GPRS system 202 for receiving the call description records (CDRs) therefrom.

This may be accomplished by receiving CDRs directly from the SGSN and/or GGSN. Also, the present invention may support the Ga protocol as described by European Telecommunications Standards Institute (ETSI) specs, accepting all types of CDRs produced by SGSN and GGSN. This provides mobility, short message service (SMS), and quality of service (QoS). It should be noted, however, that the accounting system 200 may interface the GPRS system by any desired means. The accounting system 200 may monitor all the traffic (e.g. user traffic, control/management traffic, network signaling, etc.) carried over any interface in the GPRS system. This enables the accounting system 200 to collect real-time information associated with customer communication over the wireless network as well as IP content usage.

As will soon become apparent, the system 200 uses the received CDRs to map IP content events to ISMs, resulting in a new type of call description records, XDRs. Such XDR's get fed into rating engines and then to a standard content based billing module 206. It should be noted that as real-time information is gathered by the system 200, various services can be provided based on collected information; e.g. billing, fraud detection, pre-paid service, QoS monitoring, network performance based dynamical provisioning, etc. For more information on how one exemplary content based billing module 206 operates, reference may be made to PCT application WO9927556A2 entitled "NETWORK ACCOUNTING AND BILLING SYSTEM AND METHOD" published Jun. 3, 1999, and which is incorporated herein by reference in its entirety. The present invention thus uses GPRS CDRs in a non-conventional way, mixing them with IP content usage records before feeding them to billing and customer care systems.

Figure 3:
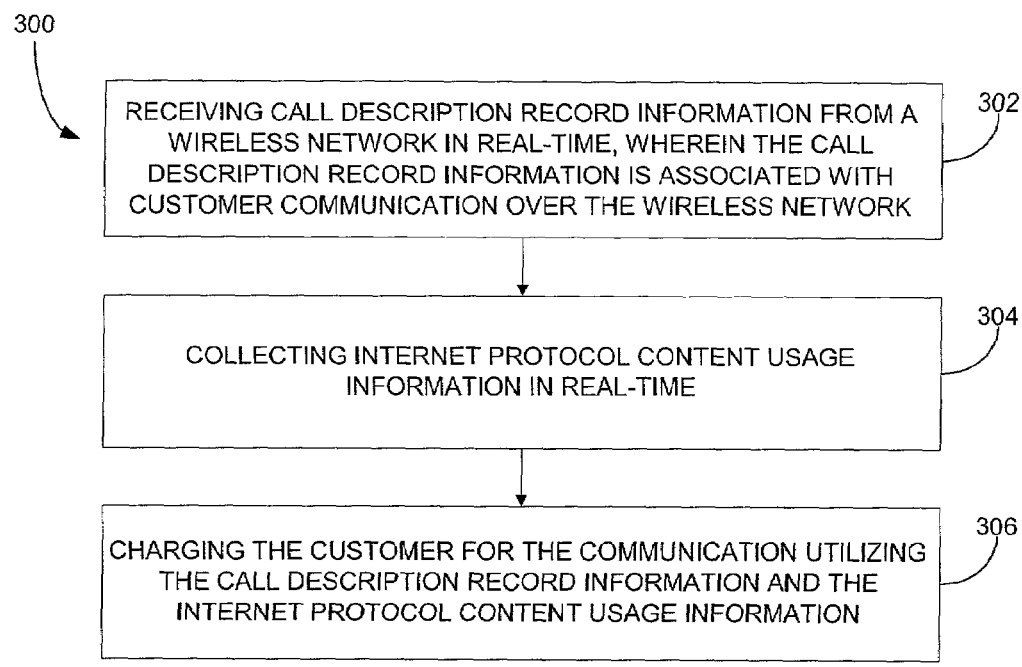
FIG. 3 illustrates a method of collecting information for the purpose of charging for Internet Protocol (IP) usage utilizing a wireless network.

FIG. 3 illustrates a method 300 of collecting information for the purpose of charging for Internet Protocol (IP) usage utilizing a wireless network. Initially, in operation 302, call description record information is received from a wireless network. Such call description record information is associated with customer communication over the wireless network.

In one embodiment, the call description record information may include conventional CDRs or any other data structure that is collected from the GPRS system, and is descriptive of calls that take place thereover. Further, the call description record information may be collected in real-time by the data gatherers 204 of the ISMs, which interface the GPRS system 202 through any GPRS internal interfaces or functional modules. Note FIG. 2. In one embodiment, the receipt of the CDRs from the GPRS prompts operation by the gatherers 204 of the ISMs. It should be noted that the call description record information may include any data structure that is collected from a wireless network and is descriptive of calls that take place on such network.

Further collected in real-time is IP content usage information associated with the transmission of content using an IP during the customer communication. Note operation 304. The IP content usage information may identify the IP usage associated with the transmission of the content. In use, such content usage information may be collected in real-time and include, but is not limited to a session's source, destination, user name, duration, time, date, type of server, volume of data transferred, and/or information on any other parameter(s) related to communication using the Internet Protocol. Armed with such accounting information, various services may be provided that require network usage metering of some sort.

Next, in operation 306, the customer is then charged for any aspect of the customer communication utilizing the real-time call description record information and the Internet Protocol content usage information. As an option, the customer may be charged for the communication by mapping the Internet Protocol content usage information to the call description record information. This mapped information is then sent to the billing module 206. Further, the mapped information may be filtered, enhanced, and/or aggregated prior to being delivered to the billing module 206.

The present invention thus enables charging for competitive IP-over-wireless services, based on usage events that are a cohesion of IP content usage records with CDRs generated by a wireless network. Additional information relating to the mapping process will be set forth in greater detail during reference to FIG. 4. As an option, the customer may be charged for the communication based on time, volume, or APN data of the call description record information. Further, fraud, churn and quality of service may be monitored utilizing the call description record information and the Internet Protocol content usage information.

It should be noted that multiple instances of the GPRS ISM can co-exist, thus providing scalability, fault-tolerance, and redundancy. One embodiment of the present invention enables the replacement of a vendor-dependent charging gateway with ISM's. This provides for ease interoperability among different GPRS equipment, and GPRS/IP convergence mediation functionality.

Figure 4:
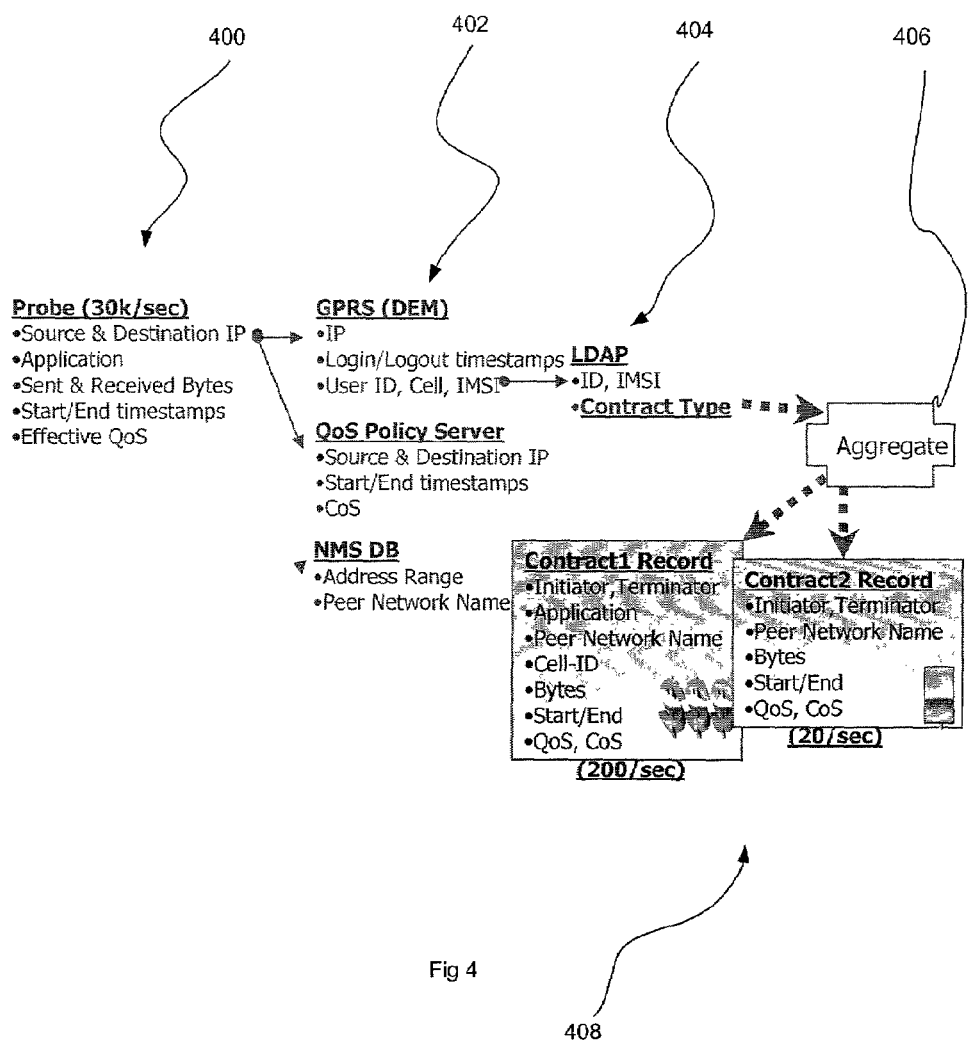
FIG. 4 is an illustration of one example of mapping the IP content usage information to the call description record information.

FIG. 4 is an illustration of one example of mapping the Internet Protocol content usage information to the call description record information. As shown, a probe 400 collects source and destination IP addresses, application information, an amount of sent and received data, start and end timestamps, and effective quality of service. Further provided is a GPRS Data Enhancement Module (DEM) 402. The DEM 402 stores a table in memory that is used to associate dynamic IP flow with International Mobile Station Identity (IMSI), cellular and quality of service. This is mapped to a Lightweight Directory Access Protocol (LDAP) 404 and aggregated with an aggregator 406. Resulting are contract records 408.

The Lightweight Directory Access Protocol (LDAP) has emerged as an Iternet Engineering Task Force (IETF) open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model, in particular, is based on an "entry", which contains information about some object. Entries are typically organized in a specified tree structure, and each entry is composed of attributes. LDAP provides the capability for directory information to be queried or updated. It offers a rich set of searching capabilities with which users can put together complex queries to get desired information from a backing store.

Same information sources can be used to create multiple types of usage records in order to bill for various types of services or to be used by various BSSs. As such, the information residing at 400 that may be collected through NetFlow, Remote Traffic Monitoring (RMON), web and e-commerce events gets further enhanced by a GPRS Associator. Further, synchronization is provided between distributed (geographically dispersed) associators, and competitive content-based tariff models may be created.

Figure 5:
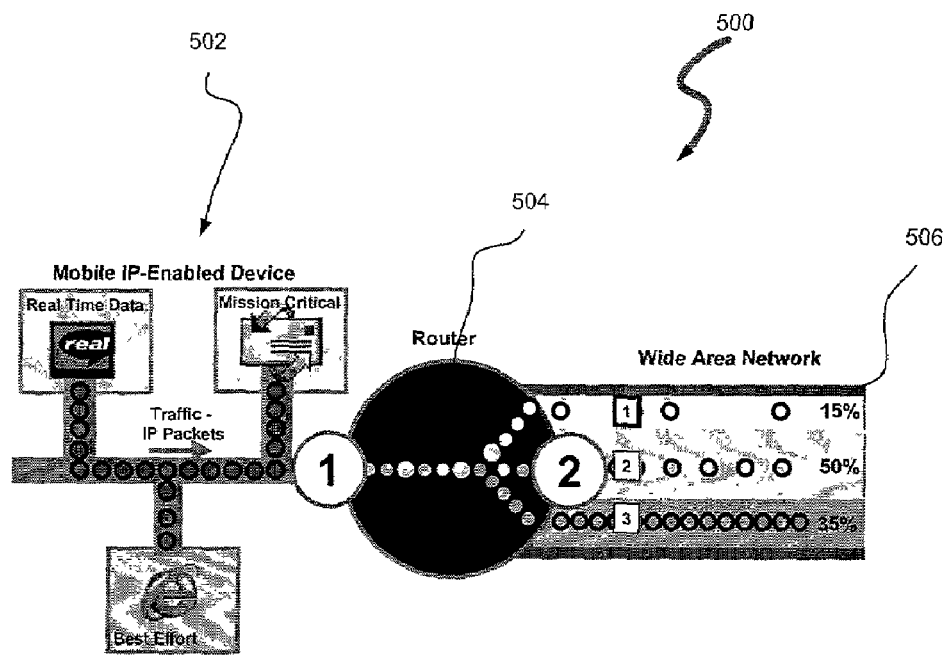
FIG. 5 illustrates a network system configured in accordance with one embodiment of the present invention.

FIG. 5 illustrates a network system 500 configured in accordance with one embodiment of the present invention. As shown, a mobile IP-enabled device 502 is coupled to a router 504 which, in turn, is coupled to a wide area network 506. In a layer-3 or layer-7 Virtual Private Network (VPN), it is possible to efficiently allocate communication resources for packets belonging to specific applications or IP addresses. GPRS APN is basically a layer-2 VPN which means allocating a dedicated data channel is possible even if it is not fully used or meets the needs of the application used by the user.

Figure 6:
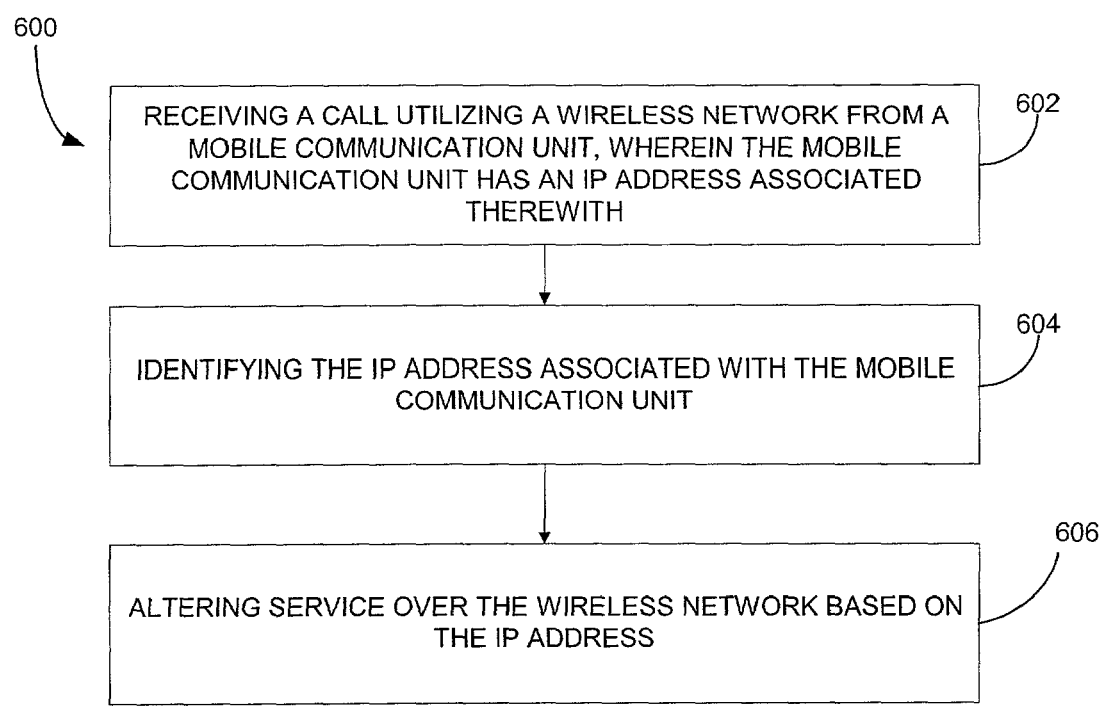
FIG. 6 illustrates a method for altering service utilizing a wireless network based on an IP address.

FIG. 6 illustrates a method 600 for altering service over a wireless network based on an Internet Protocol (IP) address. In particular, a call may be received from a mobile communication unit utilizing a wireless network in operation 602. It is important to note that each mobile communication unit or group thereof has at least one IP address associated therewith. Such IP address may be assigned or allocated in a contract, and accomplished by provisioning of a LDAP(Radius) server.

Such mobile communication units may include any type of mobile unit including but not limited to, cellular phones, lap top computers, personal digital assistants(PDAs), palm computers, etc. These mobile units may or may not employ cellular technology for providing the wireless environment.

Thereafter, in operation 604, the IP address associated with the mobile communication unit is identified. By this design, service over the wireless network may be altered based on the IP address. Note operation 606.

It should be noted that the service may be altered in any desired manner. For example, a quality of service (QoS) and/or cost of service (CoS) of the call maybe altered. Further, an access provided to the mobile communication unit during the call may be altered. For example, a mobile communication unit may be selectively precluded from accessing a corporate network and/or a publicly available wide area network (WAN), i.e. the Internet. In particular, certain address groups may only access corporate network, other addresses may only access the Internet, and still other addresses may access both. Still even other addresses may receive QoS commitment when accessing corporate network.

As an option, the service may be altered by prioritizing calls to and from the mobile communication unit. Configuration of network equipment may be required to allow prioritization of packet flows based on IP address source and destination. During use, a mobile communication unit assigned a higher priority would receive faster service since it would be serviced before units with a lower priority.

It should be noted that the foregoing factors may be set forth in a contract agreed upon at an earlier date. Further, Orchestream (IPHighway, CISCO QPM, etc) can provision network equipment to exhibit these features.

Figure 7:
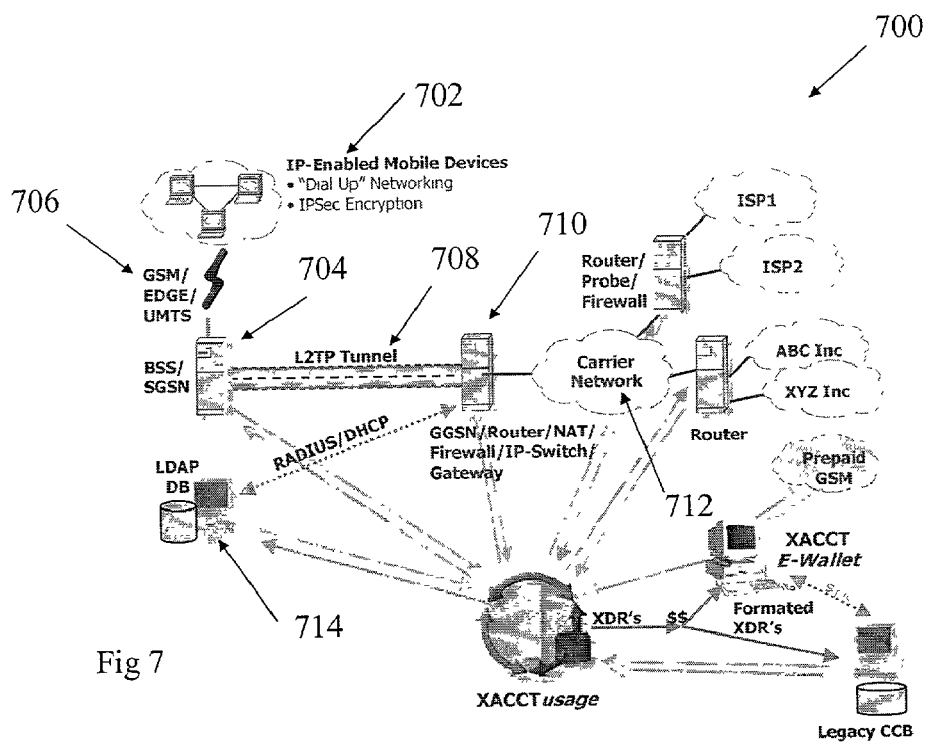
FIG. 7 shows a schematic of a system for altering service utilizing a wireless network based on an IP address in accordance with the method of FIG. 6.

FIG. 7 shows a schematic of a system 700 for altering service utilizing a wireless network based on an IP address in accordance with the method 600 of FIG. 6. As shown a plurality of IP-enabled mobile communication units 702 are provided which are adapted to connect to a base station BSS 704 over a Global System for Mobile Communication (GSM) 706 or any other wireless network.

A packet tunnel 708 is then created from the handset through a SGSN of the BSS 704 to a router 710 logically located in the GGSN. From that router 710, the packets are outputted to the operator's IP network 712. It should be noted that the customer is connected to the operator through an E1 link.

The IP routers and IP backbone switches are provisioned so that packets that originate from handsets with certain IP addresses and/or are destined to IP addresses that relate to the customer's corporation, are given higher priority. This creates a "better experience" for the corporate mobile customer, when he or she communicates with the office. Such customer can still browse the Internet and those packets go out through the ISPs to which that operator is linked. These ISPs do not necessarily provide QoS guarantees.

A LDAP Radius server 714 may be provisioned so that whenever mobile communication units belonging to these corporate customers "log-in" to the network, they will be given an IP address that exhibits the QoS guarantees described above. The present invention may collect the accounting information from the different parts of the network, correlating GPRS info with IP content in the manner set forth hereinabove. Customer care system can provision the converged network through the present invention. Converged data records may then be sent from the present invention to be rated and then sent to other systems such as an "E-Wallet" (prepaid system). For more information on such system, reference may be made to a co-pending application filed concurrently herewith under the title "SYSTEM, METHOD AND COMPUTER PROGRAM PRODUCT FOR PREPAID WIRELESS VOICE COMMUNICATION AND IP SERVICES" and Ser. No. 09/879,682 and naming Limor Schweitzer, and which is incorporated herein by reference in its entirety.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for charging for Internet Protocol usage utilizing a wireless network, comprising:
   (a) receiving call description record information from a wireless network in real-time, wherein the call description record information is associated with customer communication over the wireless network;
   (b) collecting Internet Protocol content usage information associated with the transmission of content using an IP during the customer communication in real-time; and
   (c) charging the customer for the customer communication utilizing the call description record information and the Internet Protocol content usage information;
   wherein the customer is charged for the customer communication by mapping the Internet Protocol content usage information to the call description record information to generate mapped information that is filtered, enhanced, and aggregated prior to being delivered to a billing module;
   wherein the mapping includes collecting source and destination Internet Protocol addresses, application information, an amount of sent and received data, and start timestamps;
   wherein the mapping includes storing a table that is used to associate dynamic IP flow with wireless identity information;
   wherein the mapping provides competitive content-based tariff models.

2. The method as recited in claim 1, wherein the call description record information is received from a general packet radio service system.

3. The method as recited in claim 1, wherein fraud and quality of service is monitored in real-time utilizing the call description record information and the Internet Protocol content usage information.

4. The method as recited in claim 1, wherein the customer is charged for the customer communication based on volume data.

5. The method as recited in claim 1, wherein the customer is charged for the customer communication based on time data of the call description record information.

6. The method as recited in claim 1, wherein an Internet Protocol (IP) address is assigned to mobile communication units which are capable of communicating using the wireless network.

7. The method as recited in claim 6, wherein aspects associated with the customer communication over the wireless network are varied based on the IP address.

8. The method as recited in claim 7, wherein the aspects are selected from the group consisting of quality of service, access, and prioritization.

9. The method as recited in claim 1, wherein the Internet Protocol usage information is mapped to the call description record information to generate a modified call description record.

10. The method as recited in claim 1, wherein the Internet Protocol content usage information and the call description record information are mapped to a lightweight directory access protocol (LDAP) database and aggregated with an aggregator, resulting in contract records.

11. The method as recited in claim 1, wherein information collected through NetFlow and remote traffic monitoring (RMON) web processes is further enhanced by a gobal system for mobile communication (GPRS) associator.

12. The method as recited in claim 1, wherein the mapping further includes synchronization between distributed associators.

13. The method as recited in claim 1, wherein the content usage information includes a source, destination, user name, duration, time, date, type of server and volume of data transferred.

14. A computer program product stored in a computer readable medium for charging for Internet Protocol usage utilizing a wireless network, comprising:
   (a) computer code for receiving call description record information from a wireless network in real-time, wherein the call description record information is associated with customer communication over the wireless network;
   (b) computer code for collecting Internet Protocol content usage information associated with the transmission of content using an IP during the customer communication in real-time; and
   (c) computer code for charging the customer for the customer communication utilizing the call description record information and the Internet Protocol content usage information;
   wherein the customer is charged for the customer communication by mapping the Internet Protocol content usage information to the call description record information to generate mapped information that is filtered, enhanced, and aggregated prior to being delivered to a billing module;
   wherein the mapping includes collecting source and destination Internet Protocol addresses, application information, an amount of sent and received data, and start timestamps;
   wherein the mapping includes storing a table that is used to associate dynamic IP flow with wireless identity information;
   wherein the mapping provides competitive content-based tariff models.

15. The computer program product as recited in claim 14, wherein the call description record information is received from a general packet radio service system.

16. The computer program product as recited in claim 14, wherein fraud and quality of service is monitored in real-time utilizing the call description record information and the Internet Protocol content usage information.

17. The computer program product as recited in claim 14, wherein the customer is charged for the customer communication based on volume data.

18. The computer program product as recited in claim 14, wherein the customer is charged for the customer communication based on time data of the call description record information.

19. The computer program product as recited in claim 14, wherein an Internet Protocol (IP) address is assigned to mobile communication units which are capable of communicating using the wireless network.

20. The computer program product as recited in claim 19, wherein aspects associated with the customer communication over the wireless network are varied based on the IP address.

21. The computer program product as recited in claim 20, wherein the aspects are selected from the group consisting of quality of service, access, and prioritization.

22. A system for charging for Internet Protocol usage utilizing a wireless network, comprising:
(a) logic for receiving call description record information from a wireless network in real-time, wherein the call description record information is associated with customer communication over the wireless network;
(b) logic for collecting Internet Protocol content usage information associated with the transmission of content using an IP during the customer communication in real-time; and
(c) logic for charging the customer for the customer communication utilizing the call description record information and the Internet Protocol content usage information;
wherein the customer is charged for the customer communication by mapping the Internet Protocol content usage information to the call description record information to generate mapped information that is filtered, enhanced, and aggregated prior to being delivered to a billing module;
wherein the mapping includes collecting source and destination Internet Protocol addresses, application information, an amount of sent and received data, and start timestamps;
wherein the mapping includes storing a table that is used to associate dynamic IP flow with wireless identity information;
wherein the mapping provides competitive content-based tariff models.

23. A method for altering service over a wireless network based on an Internet Protocol (IP) address, comprising:
(a) receiving a call from a mobile communication unit utilizing a wireless network, wherein the mobile communication unit has an IP address associated therewith;
(b) identifying the IP address associated with the mobile communication unit; and
(c) altering service over the wireless network based on the IP address:
wherein a customer is charged for customer communication by mapping Internet Protocol content usage information to call description record information to generate mapped information that is filtered, enhanced, and aggregated prior to being delivered to a billing module;
wherein the service is altered by altering an access provided to the mobile communication unit during the call;
wherein the service is altered by altering a prioritization of the call;
wherein the mapping includes collecting source and destination Internet Protocol addresses, application information, an amount of sent and received data, and start timestamps;
wherein the mapping includes storing a table that is used to associate dynamic IP flow with wireless identity information;
wherein the mapping provides competitive content-based tariff models.

24. The method as recited in claim 23, wherein the service is altered by altering a quality of service of the call.

25. The method as recited in claim 23, wherein the access is altered by selectively precluding access to a particular network based on whether the IP address resides within a predetermined address group.

26. The method as recited in claim 23, wherein the prioritization includes prioritization of packet flows based on an IP address source and destination so that a mobile communication unit assigned a higher priority receives faster service by being serviced before mobile communication units with a lower priority.

27. The method as recited in claim 23, wherein the IP address associated with the mobile communication unit is assigned to the mobile communication unit in response to a connection made with a particular network such that the assigned IP address ensures a predetermined quality of service.

28. A computer program product stored in a computer readable medium for altering service over a wireless network based on an Internet Protocol (IP) address, comprising:
(a) computer code for receiving a call from a mobile communication unit utilizing a wireless network, wherein the mobile communication unit has an IP address associated therewith;
(b) computer code for identifying the IP address associated with the mobile communication unit; and
(c) computer code for altering service over the wireless network based on the IP address:
wherein a customer is charged for customer communication by mapping Internet Protocol content usage information to call description record information to generate mapped information that is filtered, enhanced, and aggregated prior to being delivered to a billing module;
wherein the mapping includes collecting source and destination Internet Protocol addresses, application information, an amount of sent and received data, and start timestamps;
wherein the mapping includes storing a table that is used to associate dynamic IP flow with wireless identity information;
wherein the mapping provides competitive content-based tariff models.

29. The computer program product as recited in claim 28, wherein the service is altered by altering a quality of service of the call.

30. A system for altering service over a wireless network based on an Internet Protocol (IP) address, comprising:
(a) logic for receiving a call from a mobile communication unit utilizing a wireless network, wherein the mobile communication unit has an IP address associated therewith;
(b) logic for identifying the IP address associated with the mobile communication unit; and
(c) logic for altering service over the wireless network based on the IP address:
wherein a customer is charged for customer communication by mapping Internet Protocol content usage information to call description record information to generate mapped information that is filtered, enhanced, and aggregated prior to being delivered to a billing module;
wherein the mapping includes collecting source and destination Internet Protocol addresses, application information, an amount of sent and received data, and start timestamps;
wherein the mapping includes storing a table that is used to associate dynamic IP flow with wireless identity information;
wherein the mapping provides competitive content-based tariff models.

31. A system comprising:
(a) means for receiving a call from a mobile communication unit of a customer utilizing a wireless network, wherein the mobile communication unit has an IP address associated therewith;
(b) means for receiving call description record information from the wireless network in real-time, wherein the call description record information is associated with customer communication over the wireless network utilizing the mobile communication unit;
(c) mean for collecting Internet Protocol content usage information associated with the transmission of content using an IP during the customer communication in real-time;
(d) means for altering service over the wireless network based on the IP address; and
(e) means for charging the customer for the customer communication utilizing the call description record information and the Internet Protocol content usage information:
wherein the customer is charged for the customer communication by mapping the Internet Protocol content usage information to the call description record information to generate mapped information that is filtered, enhanced, and aggregated prior to being delivered to a billing module;

wherein the service is altered by altering an access provided to the mobile communication unit during the call;

wherein the service is altered by altering a prioritization of the call;

wherein the mapping includes collecting source and destination Internet Protocol addresses, application information, an amount of sent and received data, and start timestamps;

wherein the mapping includes storing a table that is used to associate dynamic IP flow with wireless identity information;

wherein the mapping provides competitive content-based tariff models.

* * * * *